United States Patent [19]

Uchida

[11] Patent Number: 4,681,153

[45] Date of Patent: Jul. 21, 1987

[54] AUTOMOTIVE AIR CONDITIONING SYSTEM WITH INDEPENDENT TEMPERATURE CONTROL FOR DUAL AIR FLOWS

[75] Inventor: Noriaki Uchida, Yokohama, Japan

[73] Assignee: Nissan Shatai Company, Limited, Kanagawa, Japan

[21] Appl. No.: 603,903

[22] Filed: Apr. 25, 1984

[30] Foreign Application Priority Data

May 31, 1983 [JP]  Japan .............................. 58-81265[U]

[51] Int. Cl.⁴ ....................... B60H 3/00; B61D 27/00; F25B 29/00
[52] U.S. Cl. ........................................ 165/31; 165/42; 165/43; 165/103; 236/13; 237/2 A; 237/12.3 B
[58] Field of Search ........................ 165/32, 35, 38, 42, 165/43, 103, 31; 236/13; 237/12.3 A, 12.3 B, 2 A; 98/2.05, 2.06, 2.08, 2.11, 38.7

[56] References Cited

U.S. PATENT DOCUMENTS

| | | | |
|---|---|---|---|
| 3,650,318 | 3/1972 | Avery | 165/103 |
| 3,813,039 | 5/1974 | Wello | 165/38 |
| 4,355,753 | 10/1982 | Watanabe | 236/13 |
| 4,408,714 | 10/1983 | Kobayashi | 236/13 |
| 4,440,212 | 4/1984 | Tanino et al. | 165/103 |
| 4,456,166 | 6/1984 | Kagohata | 236/13 |
| 4,459,466 | 7/1984 | Nakagawa et al. | 165/103 |
| 4,513,808 | 4/1985 | Ito et al. | 165/42 |
| 4,531,671 | 7/1985 | Schwenk | 237/12.3 B |

FOREIGN PATENT DOCUMENTS

| | | | |
|---|---|---|---|
| 0043017 | 4/1981 | Japan | 62/239 |
| 0026010 | 2/1982 | Japan | 62/239 |
| 58-145518 | 8/1983 | Japan . | |

Primary Examiner—William R. Cline
Assistant Examiner—John K. Ford
Attorney, Agent, or Firm—Schwartz, Jeffery, Schwaab, Mack, Blumenthal & Evans

[57] ABSTRACT

An automotive air conditioning system which delivers air from upper and lower air outlets at independently controlled temperatures has a pressure responsive door interposed between an upper air mix chamber and a space near the outlet of a heater core or a lower air mix chamber. The pressure responsive door is adapted to allow or prevent air flow from the outlet of the heater core into the upper vent air mix chamber according to the pressure differential across the door. The pressure responsive door establishes one-way air flow from the heater core into the upper air mix chamber for temperature adjustment and prevents the air in the upper air mix chamber from affecting the temperature of air in the lower air mix chamber.

14 Claims, 20 Drawing Figures

AUTOMOTIVE AIR CONDITIONING SYSTEM WITH INDEPENDENT TEMPERATURE CONTROL FOR DUAL AIR FLOWS

BACKGROUND OF THE INVENTION

The present invention relates generally to an air conditioning system for an automotive vehicle with different-temperature air flows. More particularly, the invention relates to an air conditioning system which controls the air temperatures of two air flows independently.

Published Japanese Patent Application No. 58-145518, published on Aug. 30, 1983, disclosed a dual air-flow air conditioning system which adjusts the temperatures of air exiting an opening formed in an instrument panel, which opening is hereafter referred to as "upper vent" and an opening directed toward a vehicle floor for blowing the air toward the passenger's foot, which opening is hereafter referred to as "lower vent". In the disclosed system, the temperatures of the air streams from the upper and lower vents are controlled by means of air-mix doors and a heater core. The air-mix doors control the flow of air through the heater core and mixture proportions of ambient air and heated air for controlling the temperatures of the air flows through the upper and lower vents. The conditioned air from the upper vent is referred to hereafter as "upper vent air" and the air from the lower vent is referred to hereafter as "lower vent air".

In the system disclosed in the aforementioned Published Japanese patent Application No. 58-145518, the upper vent air tends to influence temperature control of the lower vent air due to inevitable air mixing. In particular, in BI-LEVEL mode, relatively low-temperature ambient air passing through the upper vent passage for mixture with the upper vent air is apt to flow into the lower vent passage through which the lower vent air flows. As a result, the lower vent air temperature is influenced by the upper vent air, thus disturbing the temperature control for the lower vent air.

A similar dual-flow-type air conditioning system has been disclosed in the co-pending U.S. patent application Ser. No. 527,784, filed on Aug. 30, 1983 now U.S. Pat. No. 4,617,986. The temperature of the air discharged into the upper region of an enclosed space such as an automotive vehicle cabin and the temperature of the air discharged separately into the lower region thereof are individually controlled in response to a manually inputed command signal (or signals) and in response to at least one (sensed) parameter concerning the environment of the enclosed space whereby the temperature of each region can be varied according to personal taste.

SUMMARY OF THE INVENTION

An object of the present invention is to provide an air conditioning system which is capable of adjustment of air temperatures to be discharged through upper and lower air outlets separately and independently of each other.

Another object of the present invention is to provide an air conditioning system which is operative for discharging conditioning air in dual mode, in which the air conditioning system can discharge the conditioning air in split-level mode and bi-level mode.

A further object of the present invention is to facilitate fully independent control of two or more air temperature regimes with a single air heating device. A more specific object is to prevent untimely air communication between independently operable air conditioning vents while allowing desired communication.

In order to accomplish the above-mentioned and other objects, an air conditioning system according to the present invention has a pressure-responsive door interposed between an upper vent air mix chamber and an area near the outlet of a heater core or a lower vent air mix chamber. The presure-responsive door is adapted to allow air discharged from the outlet of the heater core to flow into the upper vent air mix chamber and, on the other hand, to block air flow from the upper vent air mix chamber to the mentioned area or the lower vent air mix chamber. Thus, the pressure responsive door establishes one-way air flow introducing heated air from the heater core into the upper vent air mix chamber for temperature adjustment and prevents the air in the upper vent air mix chamber from affecting the temperature of air intended for output through the lower vent.

According to one aspect of the invention, an automotive air conditioning system comprises an air induction system including a cool air source and a hot air source, an upper air mix chamber connecting the induction system and an upper air outlet, a lower air mix chamber connecting the induction system and a lower air outlet, means for controlling the proportions of cool air and hot air delivered by the induction system to the upper and lower chambers, the proportions for each of the chambers being controlling independently of the proportion for the other chamber, a communication passage between the upper and lower air mix chambers for allowing air flow therebetween, and a shutter door provided in the communication passage for establishing one-way air flow from the lower air mix chamber to the upper air mix chamber and blocking air flow from the upper air mix chamber to the lower air mix chamber, the shutter door being responsive to the air pressure in the upper air mix chamber being higher than that in the lower air mix chamber prevent air flow through the communication passage and being responsive to the air pressure in the lower air mix chamber being higher than that in the upper air mix chamber to allow air flow through the communication passage.

According to another aspect of the invention, an automotive air conditioning system comprises an air induction including a cooling air source and a heating air source, an upper air mix chamber connected to the air induction for adjusting mixture rate of a cooling air from the cooling air source and a heating air from the heating air source for adjusting the air temperature therein at a desired temperature, the upper air mix chamber located adjacent an upper air outlet for discharging the air therein through the upper air outlet, a lower air mix chamber connected to the air induction for adjusting mixture rate of a cooling air from the cooling air source and a heating air from the heating air source for adjusting the air temperature therein at a desired temperature, the lower air mix chamber located adjacent a lower air outlet for discharging the air therein through the lower air outlet, a heated air passage connecting the heating air source to both of the upper and lower air mix chambers for introducing controlled amount of heating air to respective upper and lower air mix chambers therethrough, and a shutter door provided in the heated air passage and operative between first shutting position and second opening position, the shutter door being responsive to an air pressure in the upper air mix chamber greater than that in the lower air mix chamber to be placed at the first shutting position and responsive to an air pressure in the lower air mix chamber greater than that in the upper mix chamber to be moved to the second open position for allowing the heating air from the heating air source into the upper air mix chamber.

According to yet another aspect of the invention, an automotive air conditioning system comprises an air induction system including a cooler unit and a heater core, an upper air outlet, a lower air outlet, an upper air mix chamber defined adjacent the upper air outlet and communicating with the cooler unit and the heater core respectively through first and second air passages, the upper air mix chamber receiving a controlled amount of cool air from the cooler unit and a controlled amount of heated air from the heater core, the controlled amounts being selected so as to cause the temperature of the resulting mixed air in the upper air mix chamber to match as closely as possible an upper desired temperature, a lower air mix chamber defined adjacent the lower air outlet and communicating with the cooler unit and the heater unit respectively through third and fourth air passages to receive a controlled amount of cool air from the cooler unit and a controlled amount of heated air from the heater core, the controlled amounts being so selected that the temperature of the resulting mixed air in the lower air mix chamber matches as closely as possible a lower desired temperature, a heated air passage connecting the outlet of the heater core to the upper and lower air mix chambers, and a flap door disposed within the heated air passage and interposed between the upper air mix chamber and the outlet of the heater core for establishing one-way air flow from the heater core to the upper air mix chamber.

BRIEF DESCRIPTION OF THE DRAWINGS

The present invention will be understood more fully from the detailed description given herebelow and from the accompanying drawings of the preferred embodiments of the present invention, which, however, should not be taken to limit the invention to the specific embodiments but are for explanation and understanding only.

In the drawings.

DESCRIPTION OF THE PREFERRED EMBODIMENTS

It should be noted that this application is one of five related Patent Applications in the United States of America filed on the same date as the present application. The related applications are listed below:

| U.S. Application Ser. No. | Title of the Invention |
|---|---|
| 603904, now U.S. Pat. No. 4,397,871 | Automotive Automatic Air Conditioning System With Variable Temperature Demist Mode |
| 603830, now abandoned | Method and Apparatus For Air Conditioner Control |
| 603829, now U.S. Pat. No. 4,562,954 | Method and Apparatus For Air Conditioner Control |
| 603828, now U.S. Pat. No. 4,523,715 | Method and Apparatus For Air Conditioner Control |
| Basic Japanese Application No. | Title of Invention |
| Patent Appln. Showa 58-169733 | Automatic Air Conditioning System for An Automotive Vehicle |

The contents of the above listed five co-pending related applications are hereby incorporated by reference.

In addition, the following co-pending U.S. patent applications disclose inventions related to the present invention and assigned to the common Assignee.

| U.S. Ser. No. | Filing Date |
|---|---|
| 527,784 | August 30, 1983 now U.S. Pat. No. 4,617,986 issued October 21, 1986 |
| 527,785 | August 30, 1983 now U.S. Pat. No. 4,602,675 issued July 29, 1986 |
| 526,634 | August 26, 1983 now U.S. Pat. No. 4,498,309 issued February 12, 1986 |
| 526,428 | August 25, 1983 now U.S. Pat. No. 4,538,760 issued September 3, 1985 |

The disclosure of the above-listed co-pending U.S. Patent Applications are also hereby incorporated by reference.

Figure 1:
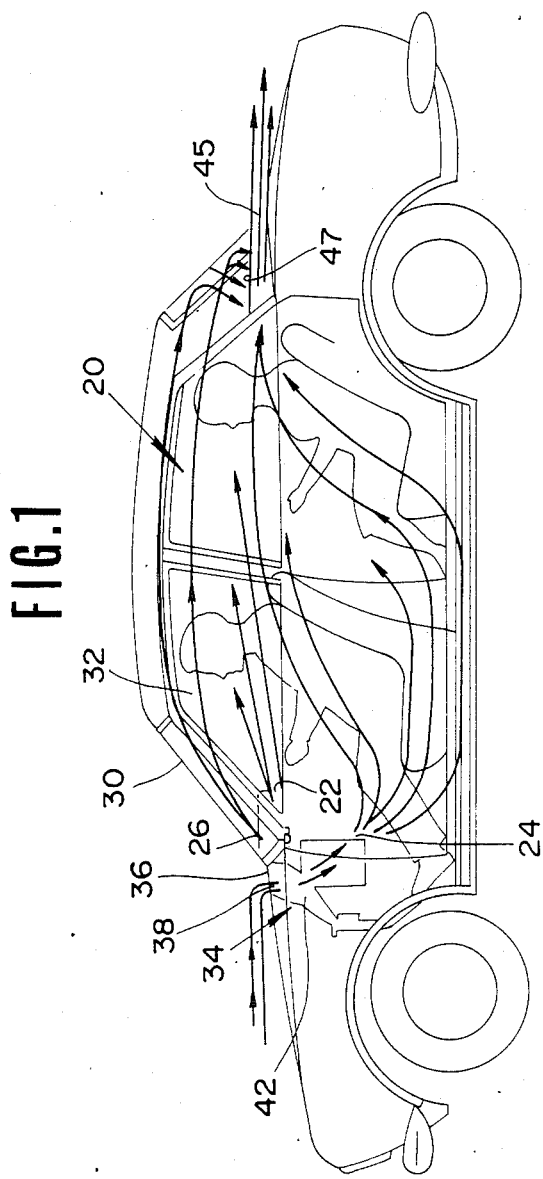
FIG. 1 is a diagram of the air flow through an automotive vehicle in which the preferred embodiment of a dual-flow-type air conditioning system according to the present invention is installed.
Figure 2:
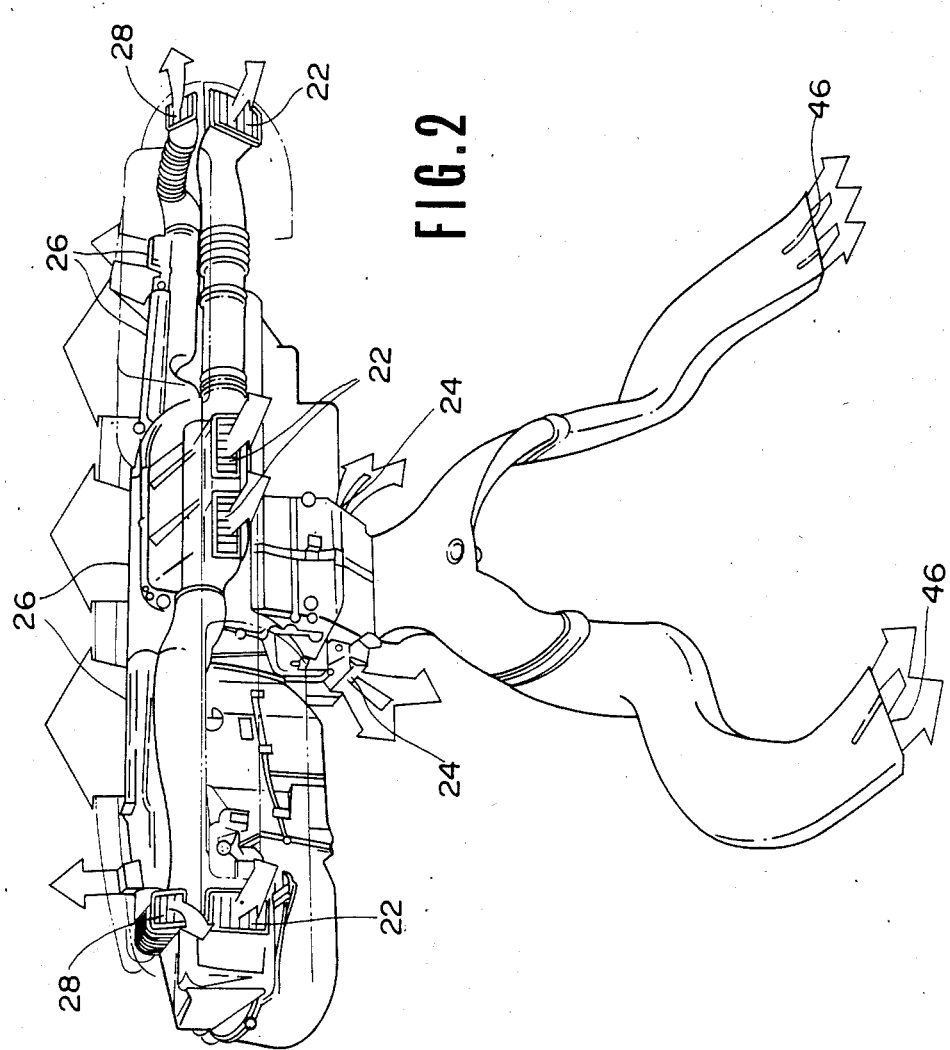
FIG. 2 is an illustration of the portions of the air conditioning system inside the vehicle of FIG. 1 and showing the positions of an upper air outlet, a lower air outlet, a defroster nozzle and so forth.

Referring now to the drawings, particularly to FIGS. 1 and 2, the major air flow regimes of a dual-flow automotive air conditioning system have been illustrated. In general, the automotive air conditioning system controls the temperature and humidity of air within the passenger compartment 20. The air conditioning system can operate in a VENT mode for ventilating the compartment air, a HEATER mode for increasing the compartment temperature, a BI-LEVEL mode for delivering relatively cool air through a upper air outlet 22 and relatively warm air through a lower air outlet 24 or a DEFROSTER mode for delivering hot air through defroster nozzles 26 and 28. The air conditioning system according to the present invention is further operative for delivering conditioned air through defroster nozzles 26 and 28 while the conditioned air is delivered through one of the upper vent outlet and the lower vent outlet. This operational mode will be hereafter referred to as "DEMIST mode" or "DEFOG mode" throughout the specification. The effect of defogging or defrosting similar to that obtained in the defroster mode can be obtained in this DEMIST or DEFOG mode, and at the same time, the effect of conditioning and dehumidifying similar to VENT or BI-LEVEL mode can be obtained.

The upper air outlet 22 serves as the aforementioned upper vent and the lower air outlet 24 serves as the aforementioned lower vent. The defroster nozzles 26 (hereafter referred to as "front defroster nozzle") are directed toward a front windshield 30 and discharge hot air in order to defrost and/or defog same. The defroster nozzles 28 (hereafter referred to as "side defroster nozzle") are directed toward side door windows 32 and discharge hot, defrosting air to clear the passengers' windows.

The air conditioning system also includes an air induction system which is generally referred to by the reference numeral 34. The air induction system 34 includes an ambient air intake 36 opening into a cowl top panel 38 and an internal air intake 40 (shown in FIG. 3) adapted to draw air in from the passenger compartment 20. The air induction system also includes a fresh/recirculate control door 70 selectively connecting an induction passage 42 to either or both of the ambient air intake 36 and the internal air intake 40. Thus, the air conditioning system can operate in FRESH mode in which the ambient air intake 36 alone is conneted to the air induction passage 42, RECIRCULATION mode in which the internal air intake 40 alone is connected to the induction passage 42, or INTERMEDIATE mode in which the induction passage 42 is connected to both the ambient air intake 36 and the internal air intake 40. In the shown structure, there is also a rear lower air outlet 46 which deliver air from below the front seats.

In FRESH mode, an air outlet 45 is formed at an appropriate point in the vehicle body in order to vent air from the passenger compartment. The air outlet 45 communicates with a ventilation intake 47 within the passenger compartment.

Figure 3:
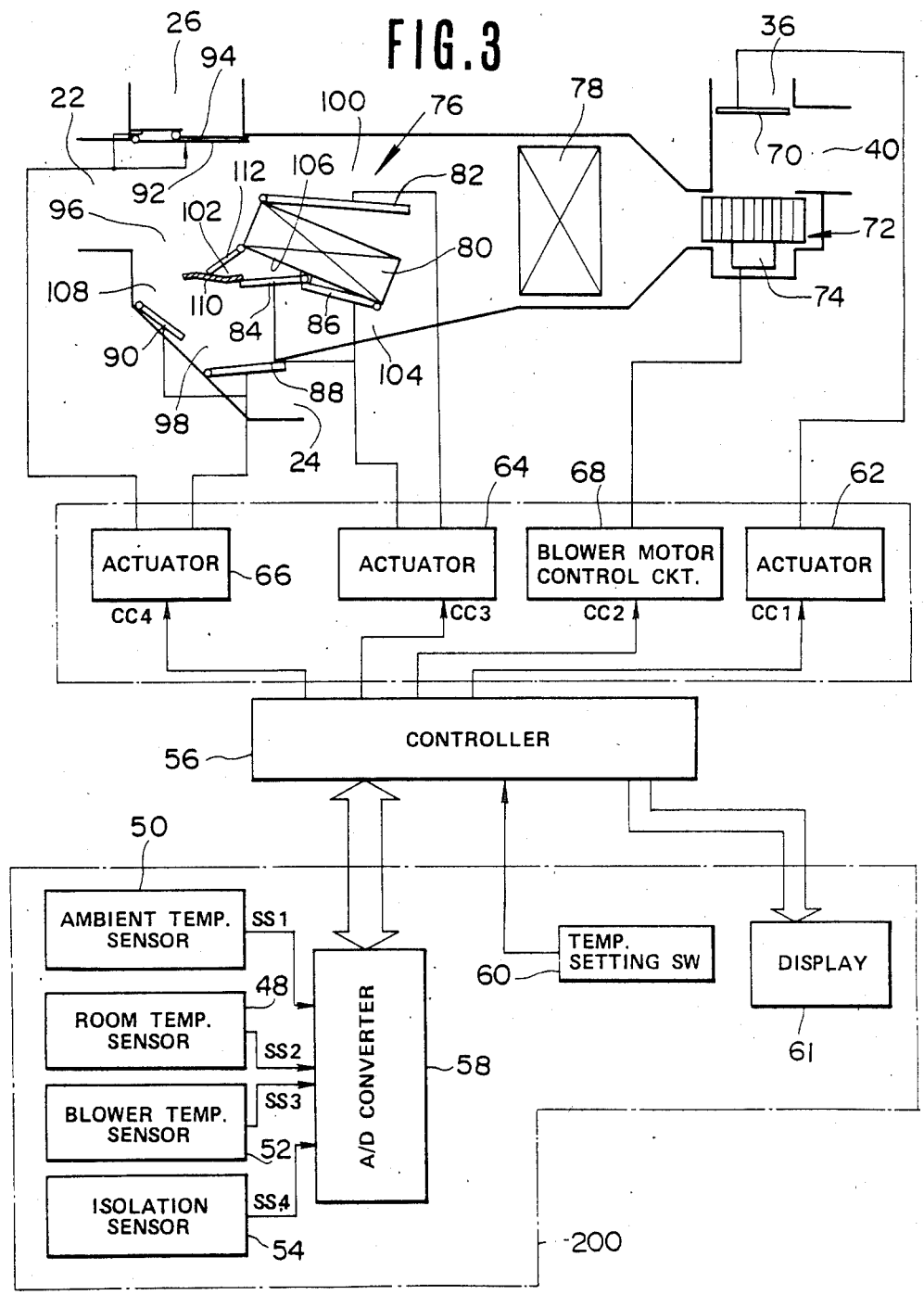
FIG. 3 is a diagram of the preferred embodiment of the air conditioning system according to the present invention.

In order to control the upper and lower vent air temperatures in automatic control, a temperature sensor 48, shown diagrammatically in FIG. 3, detects the air temperature within the passenger compartment and produces a signal indicative of the temperature in the passenger compartment, which sensor 48 will be hereafter referred to as "room temperature sensor" and the signal produced by the room temperature sensor will be hereafter referred to as "room temperature signal". Another temperature sensor 50 detects ambient air temperature outside of the passenger compartment and produces a signal indicative of the ambient temperature, which sensor 50 will be hereafter referred to as "ambient temperature sensor" and the signal produced by the ambient temperature sensor will be hereafter referred to as "ambient temperature signal". An additional temperature sensor 52 is provided in a passage communicating with the upper air outlet 22 through which upper vent air flows to detect the temperature of the upper vent air and produce a signal indicative of the upper vent air temperature, which sensor 52 will be hereafter referred to as "blower temperature sensor" and which signal produced by the blower temperature sensor will be hereafter referred to as "blower temperature signal". An isolation sensor is also provided to detect the amount of incident sunshine or insolation and produce a insolation signal.

FIG. 3 schematically illustrates the control system of the air conditioning system. The room temperature sensor 48, the ambient temperature sensor 50, the blower temperature sensor 52 and the insolation sensor 54 are connected to a controller 56 via an analog-to-digital (A/D) converter 58. A temperature setting switch 60 manually operable to set the desired room temperature is also connected to the controller 56 to supply a set temperature signal representative of the desired room temperature. The controller 56 is, in turn, connected to a display unit 61 to display the set temperature in digital form.

The controller is also connected to actuators 62, 64 and 66 and to a blower motor control circuit 68. The actuator 62 is associated with fresh/recirculate control door 70 provided at the junction of the ambient air intake 36 and the internal air intake 40 to selectively connect the induction passage 42 to one or both of the ambient air intake and the internal air intake. A blower 72 is provided in the induction passage downstream of the fresh/recirculate control door 70. The blower 72 includes a blower motor 74 associated with the blower motor control circuit. The induction passage 42 is connected to an air conditioner unit which is labelled with the reference numeral 76. The air conditioner unit 76 includes an evaporator 78 and a heater core 80, the latter being connected to an engine radiation system so that heated engine coolant can pass therethrough. As is well known, the heater core therefore serves as a kind of heat exchanger for heating air passing therethrough.

An air-mix door 82 is associated with the upstream face of the heater core 80 to control the flow of air through or around the heater core. The actuator 64 controls the position, or open degree, of air mix door 82. The actuator 64 also connected to lower vent air control doors 84 and 86 which co-operate to control the temperature of the lower vent air. The actuator 64 controls the open degree of the lower vent air control doors 84 and 86.

A lower air outlet shutter 88 and a lower vent control door 90 cooperate through a linkage (not shown) to operate alternatingly. For instance, when the lower air outlet shutter 88 is opened, the lower vent control door 90 is closed and when the lower air outlet shutter is closed, the lower vent control door is opened. Both the shutter 88 and the door 90 are controlled by the actuator 66. The actuator 66 also controls an upper air outlet shutter 92 and a defroster mode door 94.

An upper vent air mix chamber 96 is defined near the upper air outlet 22 and a lower vent air mix chamber 98 is defined below and downstream of the heater core 80. The upper vent air mix chamber is connected to an unheated air passage 100 and a heated air passage 102. The lower vent air mix chamber 98 is exposed to the unheated air passage 104 and opposes the downstream face 106 of the heater core 80. The upper vent air mix chamber 96 and the lower vent air mix chamber 98 communicate through a communication passage 108 defined by a through opening formed in an upper-and-lower vent partition 110. The communication passage 108 is opened and closed by means of the lower vent control door 90. On the other hand, a pressure responsive door 112 is hung across the heated air passage 102. The pressure responsive door 112 is responsive to air flow from the upper vent air mix chamber 96 to the lower vent air mix chamber 98 to shut the passage 102. In turn, the pressure responsive door 112 is responsive to heated air flowing through the heated air passage from the heater core outlet 106 to the upper vent air mix chamber 96 to permit the heated air to pass therethrough.

It will be appreciated that when the air conditioning system is operated in COOLER mode, the evaporator is in operation in accordance with the operation of a compressor (not shown) associated with the engine, to cool the intake air.

The nature and use of vent air temperature control parameters has been disclosed in the co-pending U.S. patent application Ser. No. 527,784, filed on Aug. 30, 1983 and assigned to the assignee of the present invention. The disclosure of the co-pending U.S. patent application Ser. No. 527,784 is hereby incorporated by reference for the sake of disclosure. In addition, the U.S. patent application Ser. No. 527,785, filed on Aug. 30, 1983, and also assigned to the assignee of the present invention, discusses the operation of a control system controlling the blower speed by adjusting the voltage to be supplied to the blower motor. The disclosure of the co-pending U.S. patent application Ser. No. 527,785 is hereby incorporated by reference for the sake of disclosure.

The operation of the air conditioner in each operational mode will be described in detail with reference to drawings FIGS. 4 to 15. Among these figures, FIGS. 4 to 9 pertain to various operation modes in automatic control, which control is performed by the controller of FIG. 3.

AUTOMATIC CONTROL

It should be noted that, in automatic control, the open degree of the air mix door 82 is controlled independently of the lower vent air control doors 84 and 86 by means of the actuator 64. In addition, the actuator 66 controls the open degrees of the upper air outlet shutter 92, the defroster mode door 94, the lower vent control door 90 and the lower air outlet shutter 88.

In automatic control, the air mix door 82 and the lower vent air control doors 84 and 86 are controlled so as to control the temperature of the passenger compartment in general. In addition, the operational mode of the air conditioning system is also controlled depending upon the difference between the room temperature and the desired or set temperature and also depending upon other preselected control parameters such as ambient air temperature, insolation and so forth. In the automatic mode selection performed in automatic control, the operational mode of the air conditioning system is selected from among the VENT, BI-LEVEL, FOOT, DEMIST and DEFROSTER modes.

In the mode selection performed under automatic control air conditioner operation, VENT, BI-LEVEL and HEATER modes are selected depending based on mode selection parameters such as insolation, ambient temperature and set temperature. In general, when the ambient air temperature is lower than a predetermined temperature which may be referred to as "heater threshold", the HEATER mode is selected in order to warm up the passenger compartment. On the other hand, when the ambient air temperature is higher than another predetermined temperature which will be referred to as "vent" threshold, the VENT mode is selected.

DEFROSTER and DEFOG modes can be selected manually while remaining in automatic control. In these operational modes manually selected in the automatic control, temperature of air discharged through the various outlets is controlled depending upon temperature control parameters such as insolation, ambient temperature, room temperature and set temperature. In addition, in these modes, the blower speed is also controlled to adjust the rate of flow through the selected outlet or outlets depending upon blower control parameters such as insolation, ambient air temperature, room temperature, set temperature, and discharge air temperature. Temperature control is performed by controlling the air mix door by means of the actuator 64.

It should be understood that although the drawings perforce show the various doors in single positions, in many cases some doors will be freely adjustable throughout their operating ranges.

VENT (AUTO=FIG. 4)

This VENT mode in automatic control is selected when the room temperature is higher than the set temperature or when the room temperature is held at approximately the set temperature. The temperature of discharge air is so controlled by the open degrees of the air mix door 82 and the lower vent air control doors 84 and 86 that the room temperature will be continuously adjusted toward the set temperature.

In the shown position, the air mix door 82 fully closes the air intake to the heater core 80 and fully opens the unheated air passage 100. On the other hand, the lower vent air control door 86 fully closes the unheated air passage 104 to block air flow therethrough. As a result, the air introduced through the evaporator 78 flows into the upper vent air mix chamber 96. In this VENT mode, the upper vent shutter 92 is opened to allow the air in the upper vent air mix chamber 96 to discharge through the upper vent 22. On the other hand, the defroster mode door 94 closes the defroster nozzle to prevent the upper vent air from flowing therethrough. Therefore, the air introduced into the upper vent air mix chamber 96 is discharged solely through the upper vent 22.

In this mode, the lower vent control door 90 closes the communication passage 108 to block air flow therethrough. Since the air pressure in the upper vent air mix chamber 96 is higher than that in the lower vent air mix chamber 98, the pressure responsive door 112 is positioned to seal the heated air passage 102, blocking communication between the upper vent air mix chamber 96 and the lower vent air mix chamber 98. As a result, despite the opening of the lower air outlet shutter 88 to open the lower air outlet 24, the relatively cool air will not be discharged through the lower air outlet.

It should be appreciated that, in this VENT mode, the lower vent air control door 86 and the defroster mode door 94 are held closed under all operating conditions. On the other hand, the upper vent shutter 92 is held open. The lower air outlet shutter 88 and the lower vent control door 90 may be alternatively operated to open and close the communication passage 108 and the lower vent 24, so that the air in the upper vent air mix chamber 96 may not flow through the lower air outlet but the air temperature in the upper vent air mix chamber 96 can be controlled by the amount of air introduced into the upper vent air mix chamber via the heater core and the heated air passage.

Figure 5:
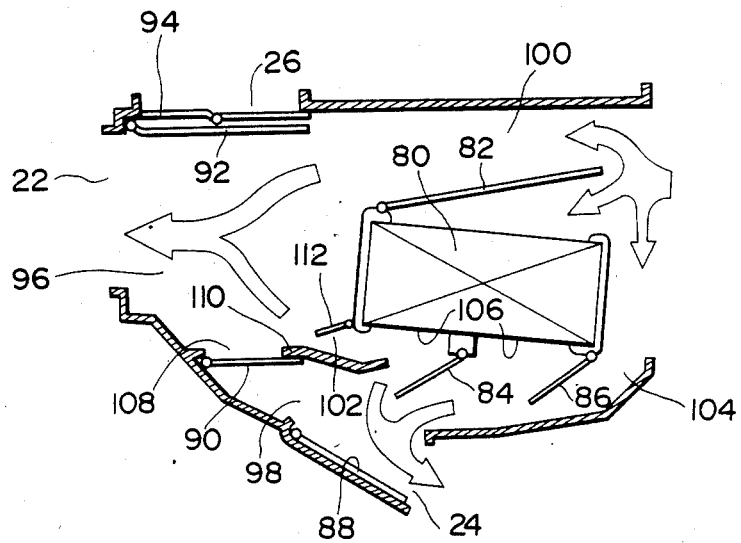
FIGS. 5 and 6 are views similar to FIG. 4 but respectively showing operation of the air conditioner in BI-LEVEL mode under automatic control.
Figure 6:
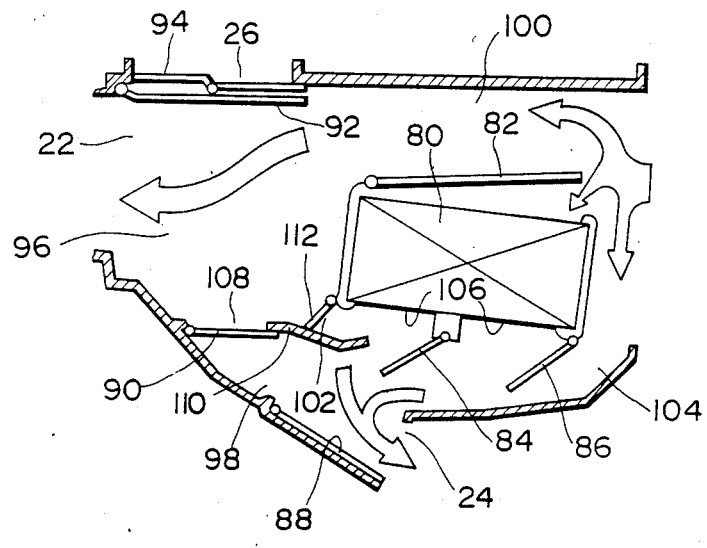
Figure 7:
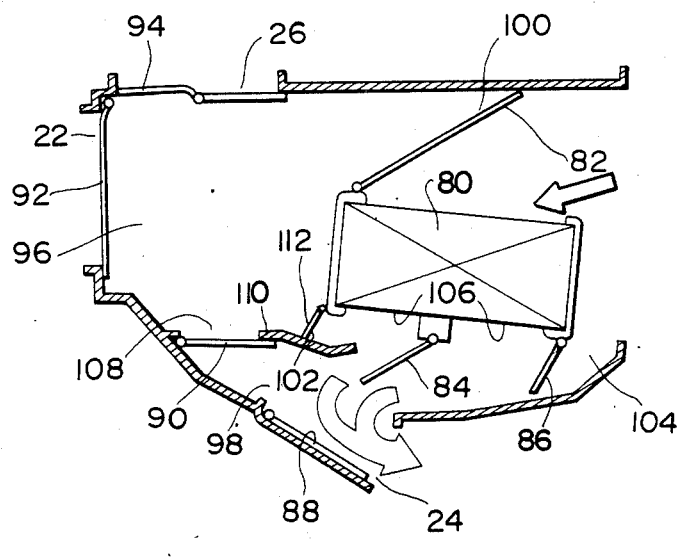
FIG. 7 is a view similar to FIG. 4 but showing operation of the air conditioner in FOOT mode in automatic control.
Figure 8:
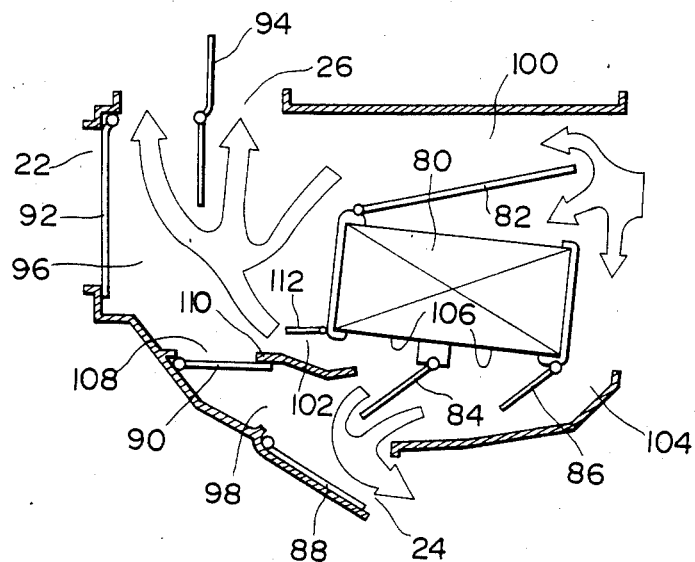
FIG. 8 is a view similar to FIG. 4 but showing operation of the air conditioner in DEMIST mode in automatic control.
Figure 9:
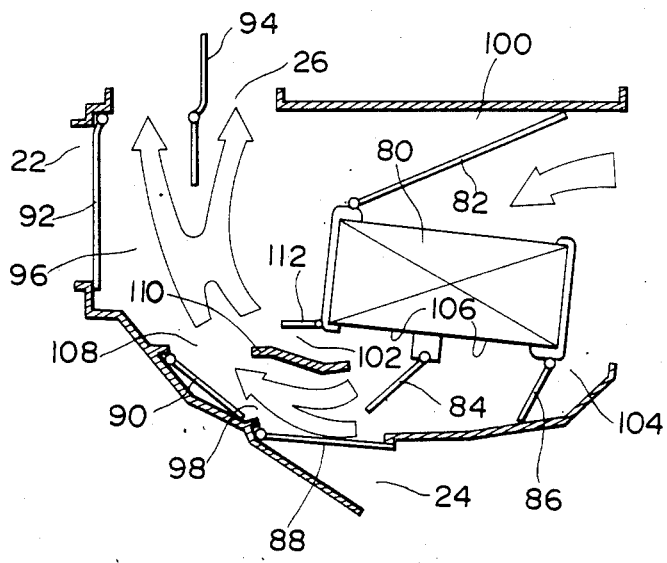
FIG. 9 is a view similar to FIG. 4 but showing operation of the air conditioner in DEFROSTER mode in automatic control.
Figure 10:
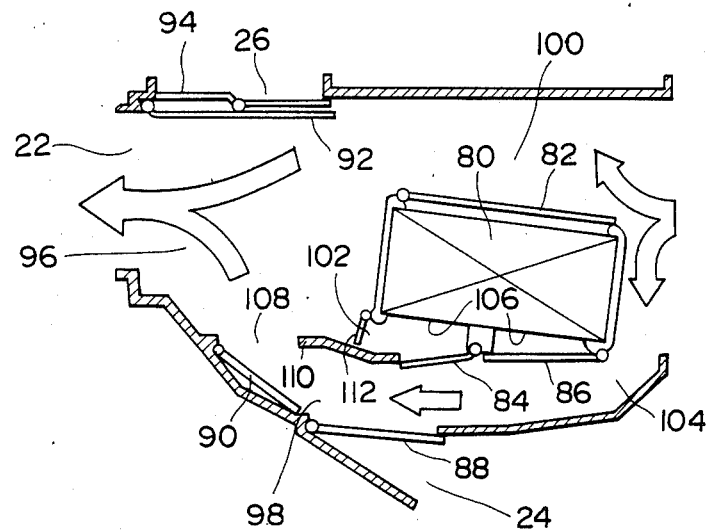
FIG. 10 is a view similar to FIG. 4 but showing operation of the air conditioner in VENT mode under manual control.

BI-LEVEL MODE (AUTO=FIGS. 5 and 6)

When the air conditioning system in automatic control is shifted to the BI-LEVEL mode, the defroster mode door 94 and the lower vent control door 90 are closed to block air flow through the defroster nozzle 26 and the communication passage 108 respectively. On the other hand, in this operational mode, the upper air outlet shutter 92 and the lower air outlet shutter 88 are both held open to allow the air in the upper and lower vent air mix chambers 96 and 98 to be discharged through the upper air outlet 22 and the lower air outlet 24 respectively.

In this BI-LEVEL mode, the air temperatures in the upper and lower vent air mix chambers 96 and 98 are controlled by adjusting the angular positions of the air mix door 82 and the lower vent air control doors 84 and 86. By adjusting the air mix door angle, the amount of air diverted into the heater core 80 from the unheated air passage 100 is determined. On the other hand, by adjusting the open degree of the lower vent air control door 86, the amount of air flowing through the unheated air passage 104 is determined. By adjusting the air flow rate through the unheated air passage 104, the proportions of heated air and cool air in the lower vent air mix chamber 98 is determined to adjust the air temperature therein to the temperature derived on the basis of the control parameters such as set temperature, the ambient air temperature, the room temperature, insolation and so forth. The air mix door and the lower vent air control doors are controlled by the actuator 64 which is, in turn, controlled by the controller 56.

When the air flowing through the unheated air passage 100 is introduced into the heater core 80 to adjust the air temperature, a greater air pressure is applied to the pressure responsive door 112 than that applied from the side of the upper vent air mix chamber. As a result, the pressure responsive door 112 is opened to establish communication between the upper and lower vent air mix chambers 96 and 98 through the heated air passage 102. In this case, if the air pressure in the upper vent air mix chamber 96 increases to greater than that in the lower vent air mix chamber 98, the pressure responsive door 112 is moved by the air pressure in the upper vent air mix chamber to block the air flow from the upper vent air mix chamber to the lower vent air mix chamber. Since the air temperature in the upper vent air mix chamber 96 is lower than that in the lower vent air mix chamber 98, the adjusted air temperature in the lower vent air mix chamber would drop due to the influx from the upper vent air mix chamber 96 if the pressure responsive door 112 is not present, thus disrupting accurate control of the lower vent air temperature. However, by providing the pressure responsive door 112 as set forth above, the relatively cool air in the upper vent air mix chamber 96 is successfully prevented from entering the lower vent air mix chamber 98 and thus the air temperature in the lower vent air mix chamber can be accurately held at the desired level.

The pressure responsive door 112 is particularly effective at the air mix door and the lower vent air control door positions illustrated in FIG. 5. For BILEVEL mode to be selected, the room temperature must already approximately correspond to the required upper and lower discharge temperatures. Therefore, very little adjustment of the temperature by means of the heater core 80 is required. For this reason, the open angle of the air mix door 82 will normally be relatively small to divert relatively little air from the unheated air passage 100 into the heater core 80.

In this case, the pressure-responsive door 112 acts to distribute most of the heated air into the lower air mix chamber 98, thus ensuring the desired thermal distribution. When the air mix door 82 is nearly closed, the pressure of air entering the upper air mix chamber 96 via the unheated air passage 100 holds the pressure-responsive door 112 closed against the relatively low pressure in the lower chamber 98 as shown in FIG. 6. When the air mix door 82 is opened wider, thus producing more heated air, the lower chamber pressure rises as the upper chamber pressure drops, so that the pressure-responsive door 112 is driven open to relieve the lower chamber pressure and divert about half of the heated air into the upper air mix chamber 96. In both cases, the passive pressure actuation of door 112 is dynamic, warming the upper air mix chamber whenever the lower chamber pressure exceeds the upper chamber pressure.

FOOT MODE (AUTO=FIG. 7)

In automatic control, the FOOT mode may be selected depending upon the control conditions. The heated air is discharged only through the lower air outlet 24. In this mode, the air-mix door 82 abuts the ceiling of the unheated air passage 100 to block fluid flow into the upper vent air mix chamber and divert all of the air flowing through the unheated air passage 100 into the heater core 80. In this case, the lower vent air control door 86 abuts the bottom of the unheated air passage 104 to block fluid flow therethrough. On the other hand, the lower vent control door 84 is fully opened to allow the heated air from the heater core to flow through the heated air outlet 106.

In addition, in the FOOT mode, the upper vent shutter 92 closes the upper vent 22 and the defroster mode door 94 fully closes the defroster nozzle 26. The lower vent control door 90 blocks communication passage 108. As a result, the upper vent air mix chamber 96 is fully closed off. As the lower vent shutter 88 is so linked as to be actuated in reverse to the lower vent control door 90, it is opened to allow the air in the lower vent air mix chamber to exit through the lower vent 24. Therefore, the heated air discharged through the heater core 80 is discharged through the lower air outlet 24.

At this position, the air pressure in the upper vent air mix chamber 96 will quickly become higher than that in the lower vent air mix chamber 98, shutting the pressure responsive door 112. As a result, the heated air, after the pressure responsive door is closed, only flows through the lower vent air mix chamber to the lower air outlet 24.

DEMIST MODE (AUTO=FIG. 8)

In this AUTO DEFOG mode, the door positions are substantially same as that in the MANUAL DEFOG mode. Accordingly, the upper air outlet shutter 92 closes the upper air outlet 22. On the other hand, the defroster mode door 94 and the lower air outlet shutter 88 are both opened to open the defroster nozzle 26 and the lower air outlet 24.

In this mode, the air mix door 82 is partially open to apportion the air between the unheated air passage 100 and the heater core 80, i.e. part of the air flowing through the unheated air passage 100 is introduced directly into the upper vent air mix chamber 96 and the rest of the air from the unheated air passage 100 flows through the heater core 80. The lower vent air control doors 84 and 86 are opened to allow heated air to flow into the lower vent air mix chamber 98 and mix with the air entering via the unheated air passage 104. In addition, some heated air also enters the upper vent air mix chamber 96 via the heated air passage 102. In this mode, the pressure-responsive door 112 apportions heated air between the upper and lower air mix chambers 96 and 98 according to their respective pressures and thus, according to the position of the air mix door 82.

As set forth above, as the lower vent control door 90 is linked with the lower air outlet shutter 88, the lower vent control door 90 is closed to prevent air flow through the communication passage 108.

In the preferred embodiment, approximately 80% of system discharge will be through the lower air outlet, and about 20% will be through the defroster nozzle. Therefore, defrosting or defogging of the front windshield and the passenger windows can be performed while heating the passenger compartment.

DEFROSTER MODE (AUTO=FIG. 9)

This AUTO DEFROSTER mode is also substantially the same as that in the MANUAL DEFROSTER mode with respect to door positions. The air mix door 82 closes the unheated air passage 100 to block air flow into the upper vent air mix chamber 96 and fully divert the air flowing through the unheated air passage 100 into the heater core 80. The lower vent air control door 86 is positioned so as to close the unheated air passage 104, blocking air flow through the unheated air passage to the lower vent air mix chamber 98. The lower vent air control doors 84 and 86 allow the heated air to flow through the heater core in the lower air mix chamber 98.

In this DEFROSTER mode, the defroster mode door 94 is open to allow the air in the upper vent air mix chamber 96 to exit through the defroster nozzle 26. On the other hand, the upper air outlet shutter 22 and the lower air outlet shutter 24 are both closed to prevent air flow through either the upper air outlet or the lower air outlet. Since the lower air outlet shutter 24 is closed, the lower vent control door 90 is opened to allow air to flow from the lower vent air mix chamber 98 into the upper chamber 96 through the communication passage 108. In addition, as the air pressure in the lower vent air mix chamber 98 is higher than that in the upper vent air mix chamber 96, the pressure responsive door 112 opens to allow air to flow through the heated air passage 102.

As a result, full amount of induced air is warmed through the heater core 80 and discharged through the defroster nozzle to quickly defrosting or defogging the front windshield and the passenger windows.

MANUAL CONTROL

It should be noted that, in manual control, the lower vent air control doors 84 and 86 cooperate with the air mix door 82 such that all the doors 82, 84 and 86 open and close together.

VENT MODE (MANUAL; FIG. 10)

Figure 4:
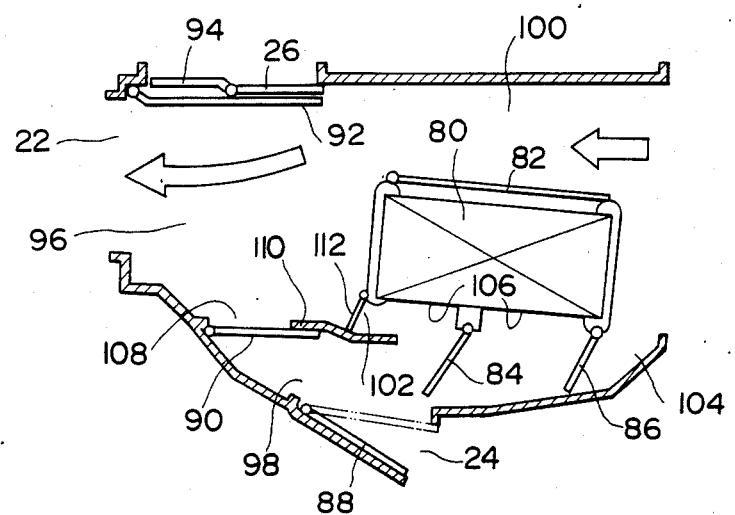
FIG. 4 is a longitudinal section view of the air conditioner operating in VENT mode under automatic control.

In the VENT mode shown in FIG. 4, upper air outlet shutter 92 and the lower vent control door 90 are opened. On the other hand, the defroster mode door 94, the lower vent air control doors 84 and 86 and the lower air outlet shutter 88 are closed. Therefore, air introduced through the intake passage 42 passes through the unheated air passages 100 and 104 and exists directly through the upper air outlet 22.

In this case, the pressure responsive door 112 is urged to close the heated air passage 102. Since the lower vent shutter 88 is closed, the cool air introduced into the lower vent air mix chamber 98 via the unheated air passage 104, flows through the communication passage 108 into the upper vent air mix chamber 96.

Figure 11:
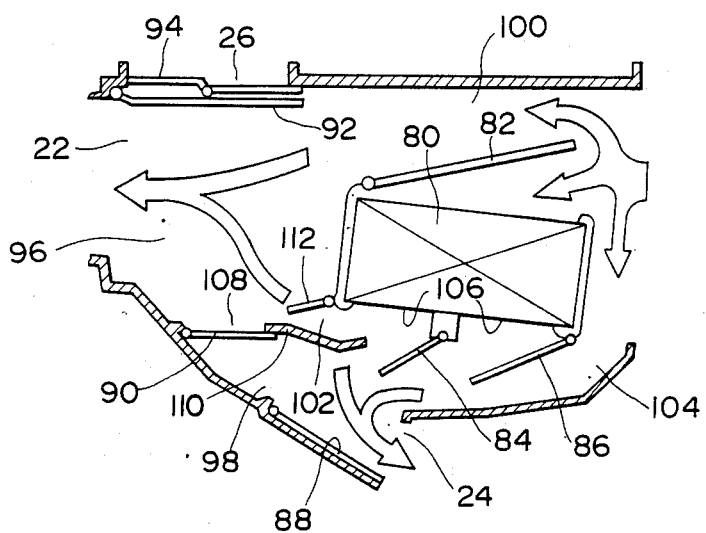
FIGS. 11 and 12 are views similar to FIG. 10 but respectively showing operation of the air conditioner in BI-LEVEL mode under manual control.
Figure 12:
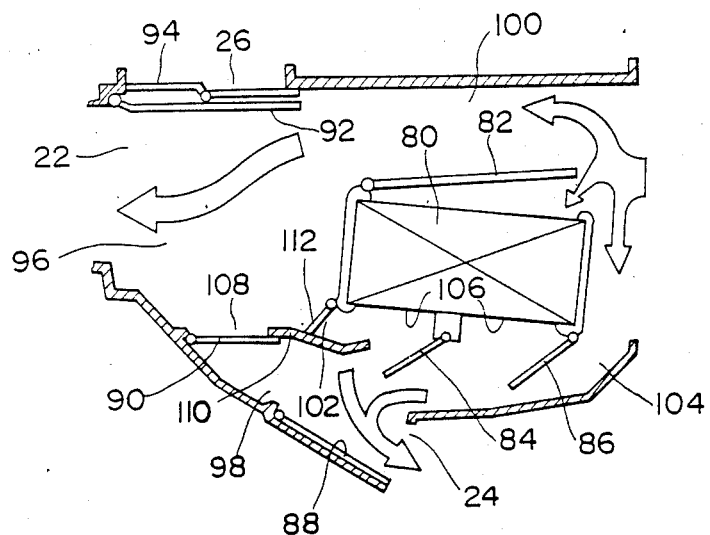

BI-LEVEL MODE (MANUAL; FIGS. 11 and 12)

In the BI-LEVEL mode shown in FIG. 11, the air mix door 82 is moved to a partially-open position corresponding to the desired air temperature. The air mix door 82 apportions the air passing through the unheated air passage 100 into the upper vent air mix chamber 96 and the heater core 80. On the other hand, the lower vent air control doors 84 and 86 are opened to allow the heated air passing through the heater core 80 to flow into the lower vent air mix chamber 98 and through the heated air passage 102 into the upper vent air mix chamber 96.

The lower vent control door 90 is closed to block communication between the upper and lower vent air mix chambers 96 and 98 via the communication passage 102. On the other hand, the lower vent shutter 88 is opened to allow the air in the lower vent air mix chamber 98 to exit through the lower air outlet 24. Unheated air also enters the lower vent air mix chamber 98 through the unheated air passage 104, which unheated air is mixed with the heated air discharged through the heated air outlet 106 to adjust the lower vent air to a desired temperature. Thus, the temperature of air exiting through the lower air outlet 24 is adjusted to the desired temperature.

The upper vent shutter 92 is opened and the defroster mode door 94 is closed. Therefore, air adjusted to a desired temperature in the upper vent air mix chamber 96 is driven out through the upper air outlet 22.

As set forth above, in this BI-LEVEL mode, conditioned air is delivered through both the upper and the lower air outlets. In this case, as is well known, the temperature of air exiting the upper air outlet 22 is normally adjusted to a lower temperature than that exiting the lower air outlet 24.

In general, the conditioned air temperature to be discharged through the upper air outlet 22 is adjusted lower than that to be discharged through the lower air outlet 24, in BI-LEVEL mode. On the other hand, the conditioned air temperature is adjusted by adjusting open degree of the air mix door 82 and the lower vent air control doors 84 and 86.

When relative low temperature is selected by operating the temperature setting switch 60, the air mix door 82 and the lower vent air control doors linked to the temperature setting switch 60 is moved to the corresponding door positions. Open degree of the air mix door 82 become relatively small as the low temperature is selected. Therefore, proportion of the intake air to be introduced into the heater core become small. Thus, most of the induction air flowing through the upper part of the induction passage 42 is introduced into the upper vent air mix chamber 96 through the unheated air passage 100. At this time the air introduced into the heater core 80 is blown out through the heater core outlet 106. Part of the heated air flows into the heated air passage 102 communicating to the upper vent air mix chamber 96. The other part of the heated air flows into the lower vent air mix chamber 98.

At this time, since the amount of air introduced into the upper vent air mix chamber through the unheated air passage 100 is substantially larger than that to be introduced through the heated air passage 102. As a result, the pressure responsive door 112 moves to shut air communication through the heated air passage 102, as shown in FIG. 12. This prevents relatively cool air in the upper vent air mix chamber from flowing into the lower vent air mix chamber for lowering the air temperature in the latter air mix chamber.

FOOT MODE (MANUAL=FIG. 13)

In the FOOT mode, heated air is delivered only through the lower air outlet 24. In this mode, the air-mix door 82 abuts the ceiling of the unheated air passage 100 to block air flow into the upper vent air mix chamber and so all of the intaken air flows through the unheated air passage 100 into the heater core 80. In this case, the lower vent air control door 86 abuts the bottom of the unheated air passage 104 to block air flow therethrough. On the other hand, the lower vent control door 84 is fully opened to allow the heated air from the heater core to flow through the heater core outlet 106.

In addition, in the FOOT mode, the upper vent shutter 92 is positioned so as to close the upper vent 22 and the defroster mode door 94 fully closes the defroster nozzle 26. The lower vent control door 90 also seals the communication passage 108. As a result, the upper vent air mix chamber 96 is fully closed off. Since the lower vent shutter 88 is so linked as to be the reverse of the lower vent control door 90, it is opened, thus allowing air in the lower vent air mix chamber to flow through the lower vent 24. Therefore, the heated air discharged through the heater core 80 exits through the lower air outlet 24.

In this position, since the air pressure in the upper vent air mix chamber 96 exceeds that in the lower vent air mix chamber 98, the pressure responsive door 112 is held in the closed position, thus shutting off the heated air passage 102 from the upper vent air mix chamber. As a result, the heated air, after the pressure responsive door is closed, only flows through the lower vent air mix chamber to the lower air outlet 24.

Therefore, in this FOOT mode, the heated air is delivered through the lower air outlet 24 expressly for warming the feet and legs of the driver and passengers. In this case, in the air flow system as illustrated in FIG. 2, the rear lower air outlet 44 also discharges heated air to warm the feet of the rear seat passengers.

DEMIST MODE (MANUAL=FIG. 14)

In the DEMIST mode, the upper air outlet shutter 92 closes the upper air outlet 22. In addition, the defroster mode door 94 and the lower air outlet shutter 88 are both opened to open the defroster nozzle 26 and the lower air outlet 24.

In this position, the air mix door 82 is left in a half-opened position to apportion the air passing through the unheated air passage 100. As a result, part of the air flowing through the unheated air passage 100 is introduced directly into the upper vent air mix chamber 96. The rest of the air flowing through the unheated air passage 100 passes through the heater core 80. The lower vent air control doors 84 and 86 are opened to allow heated air to pass through the heated air outlet 106. The heated air discharged through the heated air outlet 106 flows into the lower vent air mix chamber 98 and mixes with air introduced directly via the unheated air passage 104. On the other hand, heated air is also introduced into the upper vent air mix chamber 96 via the heated air passage 102. In this case, since the pressure in the lower vent air mix chamber 98 is higher than that in the upper vent air mix chamber 96, the pressure responsive door 112 is held open to allow heated air to flow through the heated air passage 102.

As set forth above, due to linkage between the lower vent control door 90 and the lower air outlet shutter 88, the lower vent control door 90 is closed to block air flow through the communication passage 108.

In the preferred embodiment, 80% of air conditioner output will be discharged through the lower air outlet, and 20% will be discharged through the defroster nozzle. Therefore, the windows and windshield can be defrosted or defogged at the same time the passenger compartment is being heated.

DEFROSTER MODE (MANUAL=FIG. 15)

Figure 13:
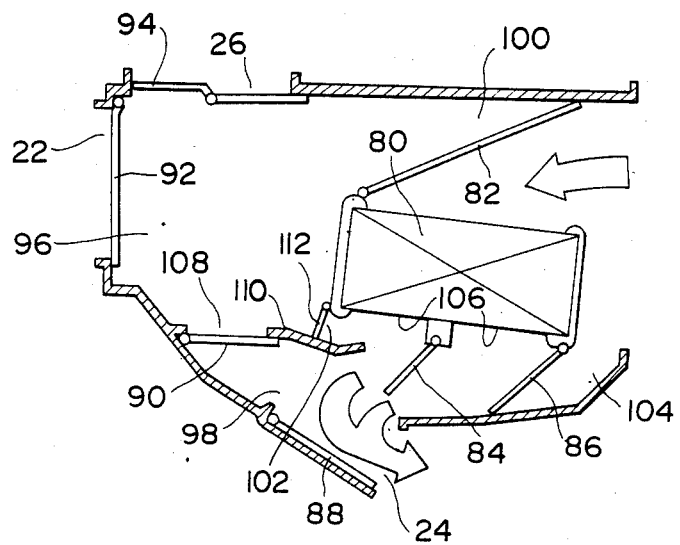
FIG. 13 is a view similar to FIG. 10 but showing operation of the air conditioner in FOOT mode under manual control.
Figure 14:
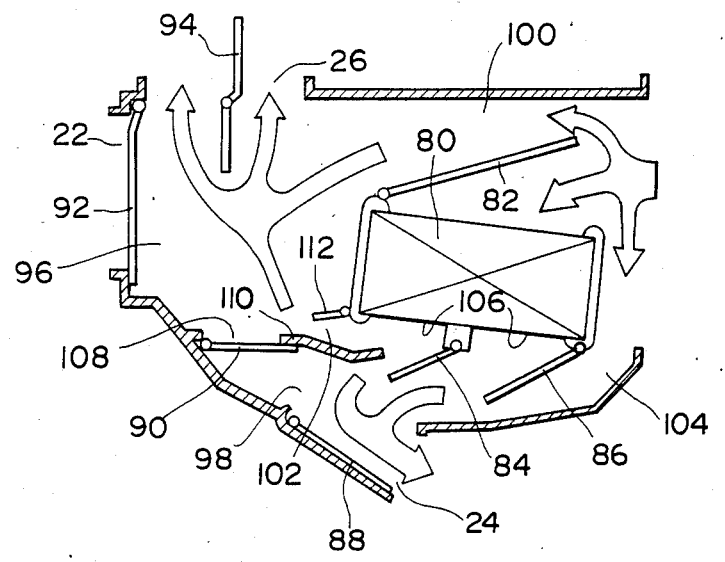
FIG. 14 is a view similar to FIG. 10 but showing operation of the air conditioner in DEMIST mode under manual control.
Figure 15:
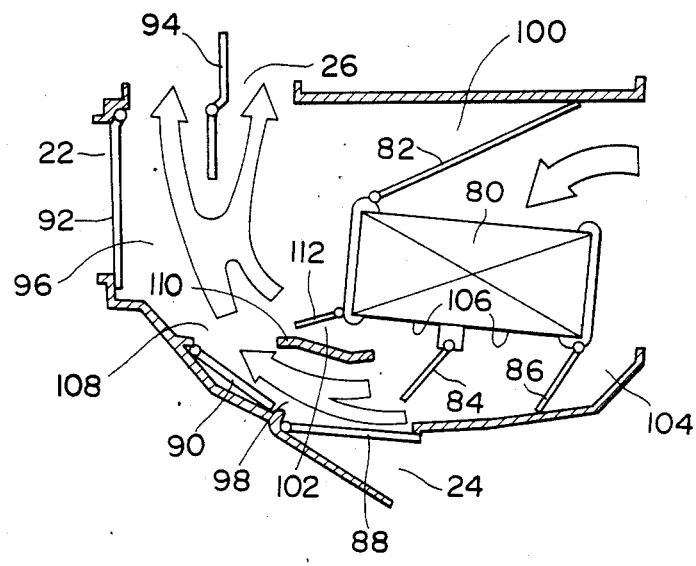
FIG. 15 is a view similar to FIG. 10 but showing operation of the air conditioner in DEFROSTER mode under manual control.

Similarly to the aforementioned FOOT mode of FIG. 13, the air mix door 82 closes the unheated air passage 100 to block air flow to the upper vent air mix chamber 96. All of the air flowing through the unheated air passage 100 is diverted into the heater core 80 by the air mix door 82. On the other hand, in this mode, the lower vent air control door 86 is actuated to close the unheated air passage 104 and so block air flow through the unheated air passage to the lower vent air mix chamber 98. In addition, the lower vent air control doors 84 and 86 allows the diverted air to flow through the heater core.

In this DEFROSTER mode, the defroster mode door 94 is held open to allow the air in the upper vent air mix chamber 96 to flow through the defroster nozzle 26. On the other hand, the upper air outlet shutter 22 and the lower air outlet shutter 24 both remain closed, thus blocking air flow through the upper air outlet and the lower air outlet. Since the lower air outlet shutter 24 is closed, the lower vent control door 90 is opened to allow the air in the lower vent air mix chamber 98 to exit through the communication passage 108. In addition, as the air pressure in the lower vent air mix chamber 98 is higher than that in the upper vent air mix chamber 96, the pressure responsive door 112 opens to allow air flow through the heated air passage 102.

As a result, all of the air drawn into the system is warmed by the heater core 80 and discharged through the defroster nozzle in order to defrost or defog the front-and side-windshields.

Figure 16:
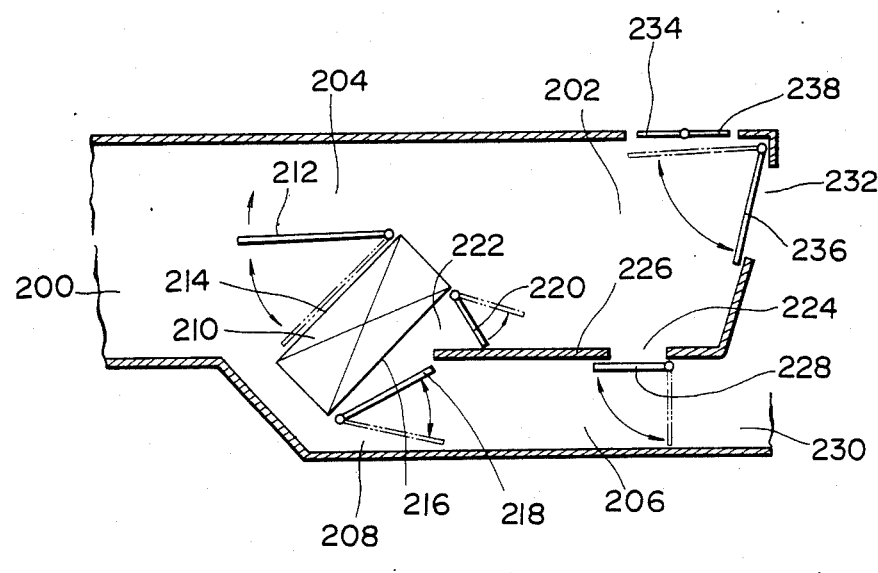
FIG. 16 is a longitudinal section of the second embodiment of an air conditioning system according to the present invention.

FIG. 16 shows the second embodiment of the dual-flow air conditioning system according to the present invention. In this embodiment, an air induction passage 200 is in communication with an upper vent air mix chamber 202 via a unheated air passage 204. The air induction passage 200 is also in communication with a lower vent air mix chamber 206 via a unheated air passage 208. A heater core 210 is positioned within the air induction passage 200 to define the unheated air passages 204 and 208 on opposite sides thereof. An air mix door 212 is mounted on the heater core 210 for opening and closing the inlet 214 of the heater core. The air mix door 212 also serves to determine the amount of air to be introduced into the heater core through the inlet 214. Adjustment of the air flow into the heater core 210 is carried out by adjusting the open degree of the air mix door. For this adjustment, the air mix door 212 is controlled by an appropriate actuator (see FIG. 3).

A lower vent air control door 218 opposes the outlet 216 of the heater core 210. The lower vent air control door 218 is adapted to open and close the lower half of the outlet and so adjust the amount of heated air flowing into the lower vent air mix chamber 206. On the other hand, a pressure responsive door 220 opposes the upper half of the outlet 216 of the heater core. The pressure responsive door 220 is hinged for free movement between its open position and closed position depending upon pressure difference between the upper vent air mix chamber 202 and the space 222 near the outlet 216. When the pressure responsive door 220 is open, the heated air discharged into the portion 222 is allowed to flow into the upper vent air mix chamber 202.

The upper and lower vent air mix chambers 202 and 206 also communicate via a communication passage 224 formed in a partition 226. The communication passage 224 can be opened or closed by means of a lower vent control door 228 which also serves as lower air outlet shutter for blocking air flow through a lower air outlet 230.

A upper air outlet 232 and a defroster nozzle 234 lead away from the upper vent air mix chamber 202. The upper air outlet 232 is opened and closed by means of a upper air outlet shutter 236. The defroster nozzle 234 is opened and closed by means of a defroster mode door 238.

In this second embodiment, the air temperature in the upper and lower vent air mix chambers 202 and 206 are controller independently. In order to prevent the air in the upper vent air mix chamber from surging into the lower ven air mix chamber, the pressure responsive door 220 establishes one-way air flow from the space 222 to the upper vent air mix chamber.

Figure 17:
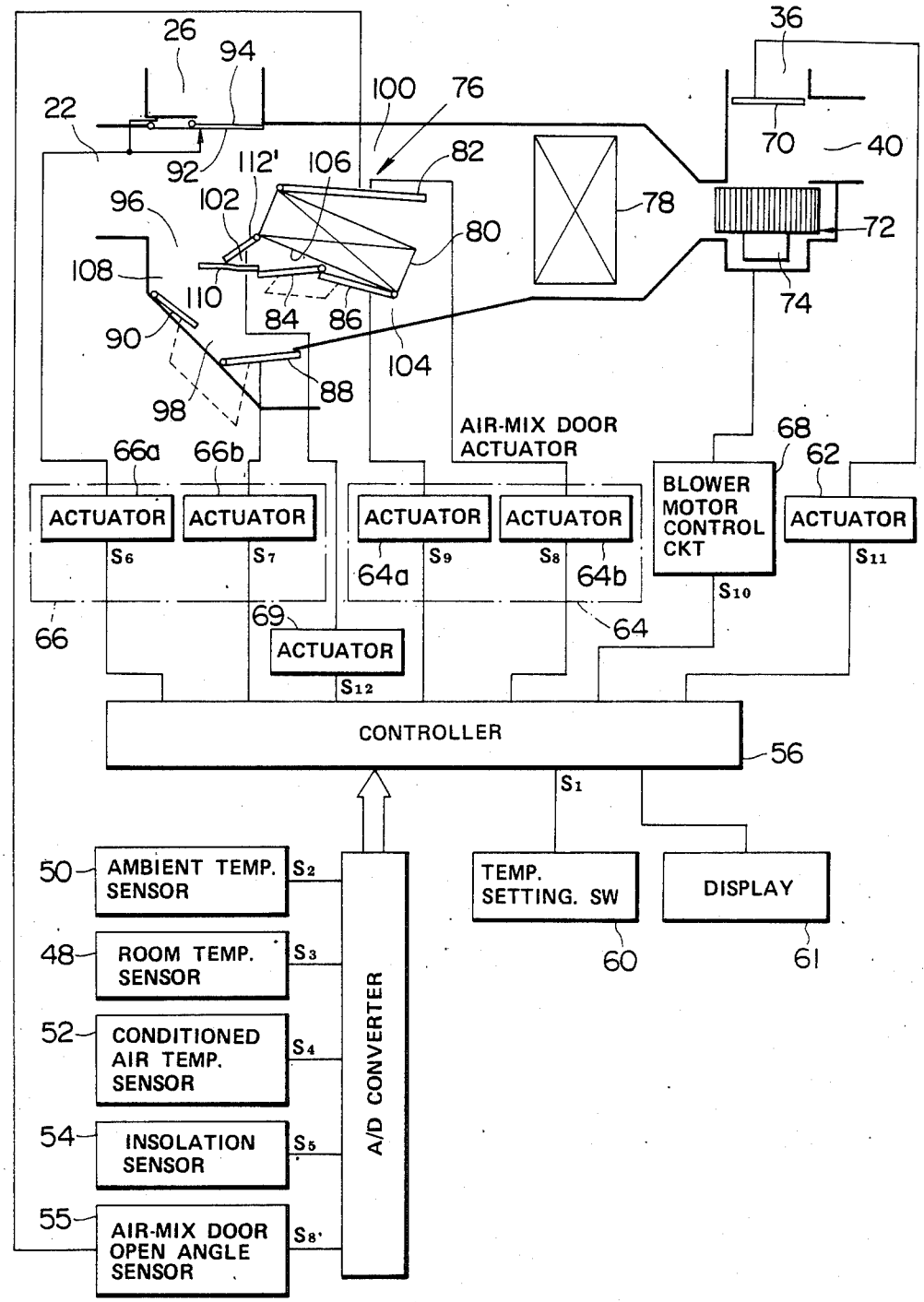
FIG. 17 is a diagram of the third embodiment of an air conditioning system according to the present invention.

FIG. 17 shows the third embodiment of the air conditioning system according to the present invention. In this embodiment, a shutter door 112′ is associated with an electrically operative actuator 69 which controls the door position. An air-mix door open angle sensor 55 is provided for detecting variation of the open angle of the air-mix door 82 across a predetermined angle. The air-mix door open angle sensor 55 comprises a potentiometer, for example, and is responsive to decreasing of the air-mix door open angle across the predetermined angle to produce a HIGH level signal $S_8'$ to the controller 56.

As will be appreciated, other elements constituting the air conditioning system are substantially the same as that disclosed with reference to FIG. 3. In order to simplify the disclosure and avoid confusion of understanding, disclosure with respect to the common elements to FIG. 3 are neglected.

In the operation, when the air-mix door open angle is decreased across the predetermined level, the output level of the air-mix door open angle sensor 55 turns from LOW to HIGH. The controller 56 is responsive to a HIGH level signal from the air-mix door open angle sensor 55 to feed a HIGH level control signal $S_{12}$ to energize the actuator 69 to close the shutter door 112′. On the other hand, when the air-mix door open angle is increased across the predeteremeined angle, the output level of the sensor 55 turns from HIGH to LOW. Therefore, the control signal $S_{12}$ turns LOW level to deenergize the actuator 69. As a result, the shutter door 112′ opens to allow the heater air to flow into the upper vent air mix chamber 96 through the one-way passage 102.

Though the aforementioned embodiment is described to employ the air-mix door open angle sensor producing HIGH/LOW signal depending upon the open angle of the air mix door 82, an air-mix door open angle sensor adapted to produce an analog signal having a value proportional to the open angle of the air-mix door can be employed. In this case, the controller may compare the value of the sensor signal $S_8'$ with a reference value $S_{8ref}$ to produce HIGH level control signal $S_{12}$ when the sensor signal value is smaller than the reference value to close the shutter door 112′.

Figure 18:
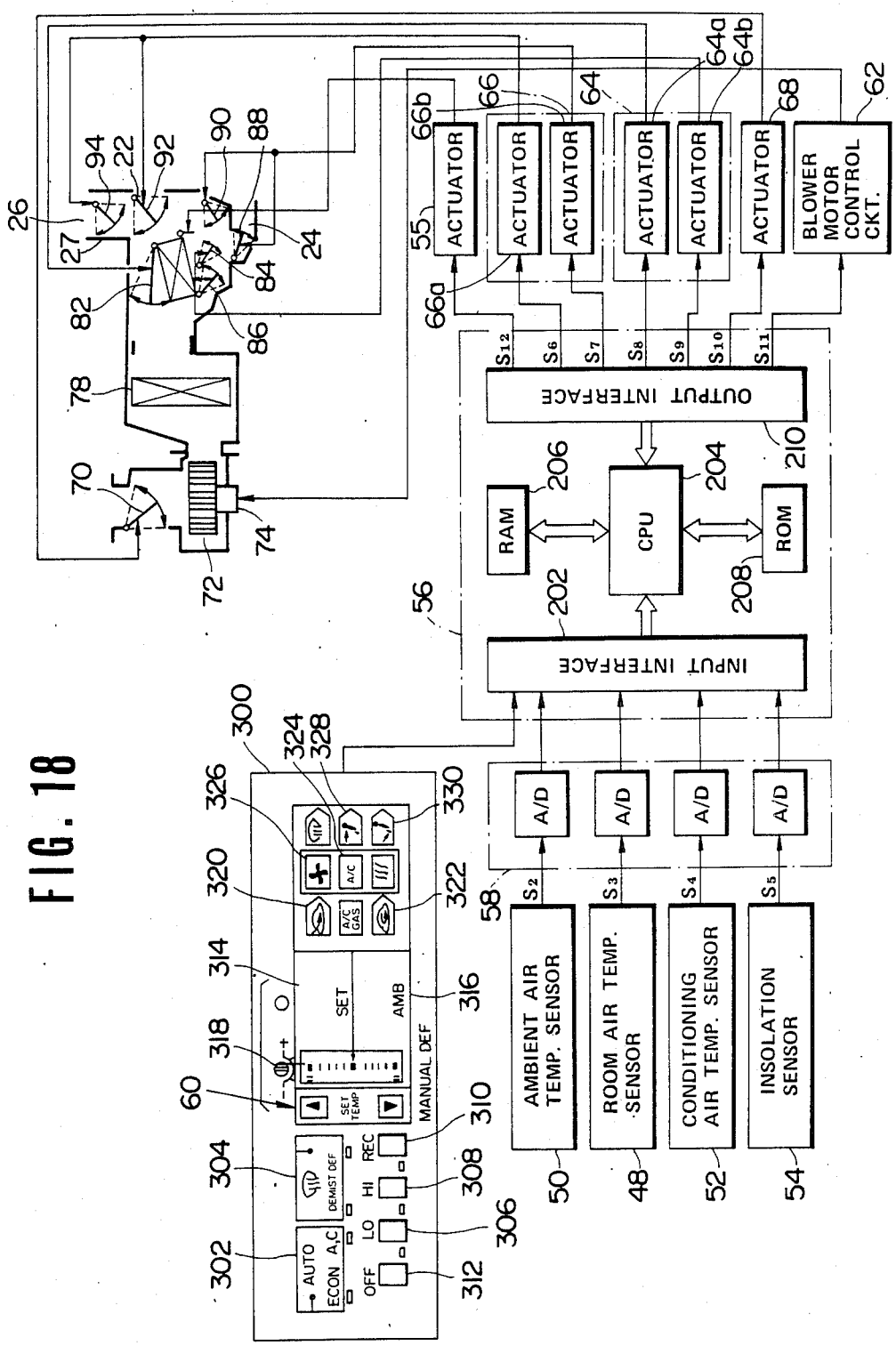
FIG. 18 is a diagram of the fourth embodiment of an air conditioning system according to the present invention.
Figure 20:
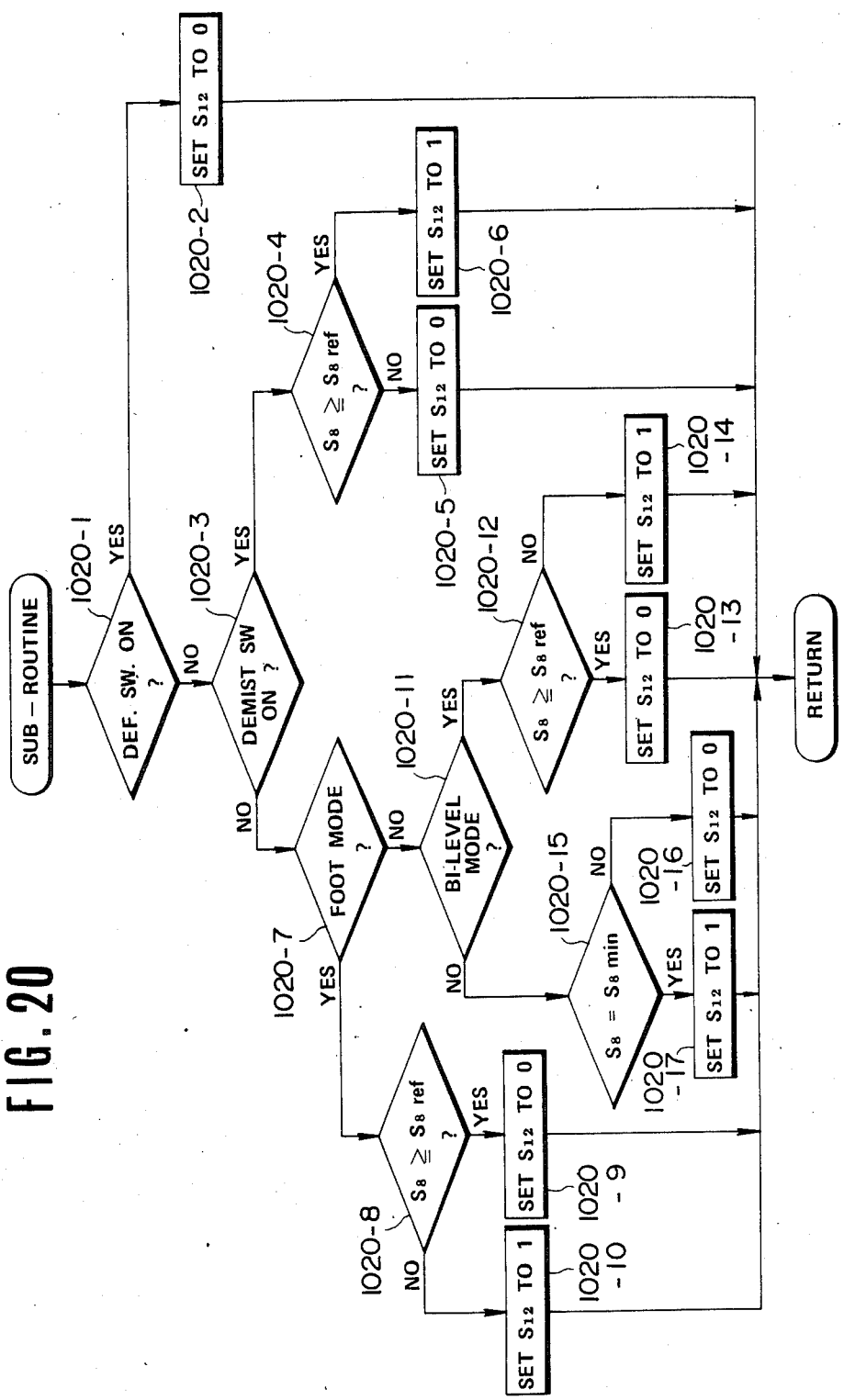
FIG. 20 is a flowchart of a sub-routine of the control program of FIG. 19 for deriving position of a shutter for an one-way passage in the air conditioning system of FIG. 18.

FIGS. 18 and 20 show the fourth embodiment of the air conditioning system according to the present invention. This fourth embodiment is directed the automatic air conditioning system in which conditioned air temperature to be discharged through the upper and lower air outlets 22 and 24 are controlled independently of each other. In practice, the air conditioning system of FIG. 18 is adapted to discharge conditioned air through the lower air outlet 24 with higher temperature than that discharged through the upper air outlet 22. The temperature difference between the upper air and the lower air can be a predetermined value. However, it may also be possible to allow setting of the conditioned air temperature for each of the upper air and lower air independently of each other irrespective to the other.

For selecting operation mode and for setting desired room temperature, an operation switch unit 300 including the temperature setting switch 60 is connected to the controller 56 which comprises a microprocessor. The operation switch unit further includes a automatic control selector switch 302. For selecting A/C mode in which cooler unit become operative to provide cooler air through the evaporator 78 or ECON mode in which cooler unit remains inoperative but automatic control of controlled air temperature is performed by mixing ambient air and the heater air from the heater core. A DEMIST/DEFROSTER mode switch 304 is also provided for selecting DEMIST and DEFROSTER modes. DEMIST and DEFROSTER modes can be selected while the air conditioning system is operated in either of A/C mode or ECON mode. Further, DEFROSTER mode can be selected independently as a sole operation mode. HIGH and LOW speed selector switches 306 and 308 are also provided for selecting maximum or minimum blower speed. Recirculation selector switch 310 is adapted to select recirculation/ventilation mode by operating the recirculation/ventilation selector door 70. System OFF switch 312 is operative for disabling blower motor driving. This OFF switch 312 allows air conditioning of the room temperature to the set temperature depending upon ram effect at the air intake.

The operation switch unit 100 further includes display unit 61 including set temperature indicator 314, ambient temperature indicator 316, set/room temperature difference indicator 318, fresh air mode indicator 320, recirculation mode indicator 322, A/C mode monitor 324, blower monitor 326, DEMIST mode indicator 328, DEFROSTER mode indicator 330, VENT mode indicator 331 and FOOT mode indicator 334.

Figure 19:
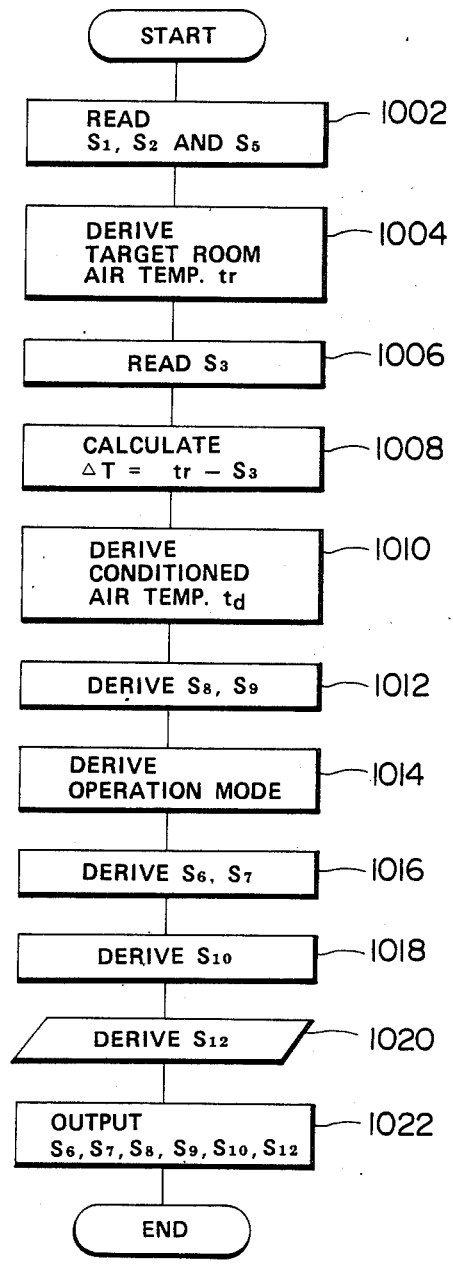
FIG. 19 is a flowchart of a control program to be executed by a controller in the air conditioning system of FIG. 18.

As shown in FIG. 18, the controller 56 comprises input interface 202, CPU 204, RAM 206, ROM 208 and output interface 210. The ambient air temperature sensor 50, the room temperature sensor 48, the conditioned air temperature sensor 52 and the insolation sensor 54 are connected to the input interface through A/D converter 58. On the other hand, actuators, 55, 66, 64 and 68 and the blower motor control circuit 62 are connected to the output interface of the controller unit. ROM stores a control program as shown in FIG. 19 for performing automatic control operation for the air conditioning system.

The control program may be executed at a given timing. In order to provide the timing, timing signal produced in per se well known manner will be used. After starting execution of the control program, at first the set temperature indicative signal $S_1$, ambient temperature indicative signal $S_2$ and the insolation value indicative signal $S_5$ are read out, at a step 1002. Based on the ambient air temperature indicative signal value and the insolation value indicative signal value, a target room temperature $t_r$ is derived from the set temperature $t_{set}$, at a step 1004. After this, the room temperature indicative signal $S_3$ is read out at a step 1006. The room temperature indicative signal value is compared with the target room temperature $t_r$ to derive the difference $\Delta t$ therebetween, at a step 1008. Based on the derived difference, the ambient temperature indicative signal values, the insolation value indicative signal value, the room temperature indicative signal value, a desired conditioned air temperature $t_d$ is derived at a step 1010. As the conditioned air temperature generally determined by proportion of the heater air and unheated air, open angle of the air mix door 82 and the lower vent air control doors 84 and 86 are derived as control signal values $S_8$ and $S_9$ at a step 1012. Further, with taking the ambient temperature indicative signal value, the insolation value and so forth, the operation mode of the air conditioning system between VENT, BI-LEVEL and HEATER (FOOT) modes is selected at a step 1014. Based on the determined operation mode, control signal values $S_6$ and $S_7$ are derived at a step 1016. In general, the actuators 66a and 66b are operative in ON/OFF manner, the control signals $S_6$ and $S_7$ are variable between HIGH level and LOW level. As the defroster mode door 94 and the upper outlet shutter 92 are operative independently of or irrespective to each other, the actuator 66a may operates the door 94 and the shutter 92 separately. If necessary, each independent actuator can be used for controlling positions of the door 94 and the shutter 92. At a step 1018, a blower speed is derived generally based on the temperature difference $\Delta T$ and preselected parameters. Control signal value $S_{10}$ indicative of the blower voltage is thus derived at the step 1018. After this, the one-way passage shutter door position is determined at a step 1020. In fact, in the step 1020, a sub-routine illustrated in FIG. 20 is executed to determine open and close of the shutter door 112'. Control signal $S_{12}$ variable between HIGH and LOW is thus derived depending upon the result of the determination at the step 1020. In practice, the shutter door 112' is opened in response to LOW level control signal $S_{12}$ and is closed in response to HIGH level control signal. After the step 1020, the control signals $S_6$, $S_7$, $S_8$, $S_9$, $S_{10}$ and $S_{12}$ are output at a step 1022.

The sub-routine for determining open and close of the shutter door 112' will be described hereafter with reference to FIG. 20. When process of control program reaches the step 1020, at first, the defroster switch is checked if it is in ON position, at a step 1020-1. When the defroster switch is in ON position, the control signal value $S_{12}$ is set to 0 (LOW) to open the shutter door 112', at a step 1020-2. When the defroster switch is in OFF position, as checked at the step 1020-1, the demist switch is checked if it is in ON position, at a step 1020-3. When the demist switch is in ON position, the signal value $S_8$ is compared with a predetermined reference value $S_{8ref}$ which is indicative of shutter door open-and-close criteria, at a step 1020-4. When the siganl value $S_8$ is equal to or greater than the reference value $S_{8ref}$, the control signal $S_{12}$ is set to 0 (LOW) to open the shutter door, at a step 1020-5. On the other hand, when the signal value $S_8$ is smaller than the reference value $S_{8ref}$, the control signal value $S_{12}$ is set to 1 (HIGH) to close the shutter door, at a step 1020-6. When the demist switch, as checked at the step 1020-3 is in OFF position, the signal levels of the control signals $S_6$ and $S_7$ are checked at a step 1020-7 for judging if HEATER (FOOT) mode is selected. When FOOT mode is selected, the signal value $S_8$ is again compared with the predetermined reference value $S_{8ref}$, at a step 1020-8. When the signal value $S_8$ is equal to or greater than the reference value $S_{8ref}$, the control signal $S_{12}$ is set to 0 (LOW) to open the shutter door, at a step 1020-9. On the other hand, when the signal value $S_8$ is smaller than the reference value $S_{8ref}$, the control signal value $S_{12}$ is set to 1 (HIGH) to close the shutter door, at a step 1020-10. When the operation mode is not FOOT mode as checked at the step 1020-7, the operation mode is again checked if the mode is BI-LEVEL mode at a step 1020-11. Similarly to the step 1020-7 the signal levels of the control signals $S_6$ and $S_7$ are thus checked. If a specific combination of the control signals $S_6$ and $S_7$ indicative of BI-LEVEL mode of the air conditioning system is detected, the control signal value $S_8$ is compared with the predetermined reference value $S_{8ref}$ at a step 1012-12. When the signal value $S_8$ is equal to or greater than the reference value $S_{8ref}$, the control signal $S_{12}$ is set to 0 (LOW) to open the shutter door, at a step 1020-13. On the other hand, when the signal value $S_8$ is smaller than the reference value $S_{8ref}$, the control signal value $S_{12}$ is set to 1 (HIGH) to close the shutter door, at a step 1020-14. When the operation mode selected is not BI-LEVEL mode, the signal value $S_8$ is compared with a given minimum value $S_{8min}$ which is indicative of fully closed position of the air mix door, at at step 1020-15. For instance, at the step 1020-15, full-cool mode in VENT mode is checked. If full-cool condition is detected, the control signal $S_{12}$ is set to 1 to close the shutter door 112', at a step 1020-16. If the control signal value $S_8$ is greater than the given minimum value $S_{8min}$ as checked at the step 1020-15, the control signal value $S_{12}$ is set to 0 (LOW) to open the shutter door 112'. After the steps 1020-2, 1020-5, 1020-6, 1020-9, 1020-10, 1020-13, 1020-14, 1020-17 and 1020-18, process returns to the main routine of the control program.

While the specific embodiments have been disclosed for full disclosure of the present invention, the invention should not be understood or interpreted to be limitted to the shown embodiments but should be understood to include all possible modifications and embodiments which do not depart from the principles and features of the appended claims.

What is claimed is:

1. An automotive air conditioning system, comprising:
    means for cooling inlet air;
    means for heating inlet air;
    an upper air mix chamber;
    a lower air mix chamber;
    a first air passage connecting an outlet of said cooling means to said upper air mix chamber for delivering cool air from said cooling means to said upper air mix chamber, said first air passage facing an inlet of said heating means;
    a second air passage connecting said cooling means to said lower air mix chamber for delivering cool air from said cooling means to said lower air mix chamber;
    a third air passage connecting an outlet of said heating means to said lower air mix chamber for delivering hot air from said heating means to said lower chamber;
    a first control means associated with said inlet of said means for heating air for controlling the proportion of said cool air to be delivered through said first passage and to be delivered into said means for heating air;
    a second control means associated with said second air passage for controlling the proportion of cool air to be delivered to said lower air mix chamber through said second air passage;
    one-way air flow means communicating with said third air passage and including a shutter door for establishing one-way air flow from said third air passage to said upper air mix chamber and for blocking air flow from said upper air mix chamber to said third air passage;
    a third control means associated with said outlet of said means for heating air for controlling the delivery of said hot air to said upper air mix chamber through said one-way air flow means and the delivery of hot air to said lower air mix chamber through said third air passage;
    at least one upper air outlet communicating with said upper air mix chamber and adapted to discharge air in said upper air mix chamber to a vehicle compartment; and
    at least one lower air outlet communicating with said lower air mix chamber and adapted to discharge air in said lower air mix chamber to said vehicle compartment.

2. The automotive air conditioning system as set forth in claim 1, wherein said one-way air flow means includes means for maintaining said shutter door in an open position while the proportion of hot air to be delivered to said upper air mix chamber is larger than a predetermined value, and means for maintaining said shutter door in a closed position otherwise.

3. The automotive air conditioning system as set forth in claim 1, wherein said cooling means includes an induction system, and wherein said first control means includes means for adjusting the proportion of air flowing through said induction system to be introduced into said means for heating inlet air for adjusting the proportions of hot air in the hot-and-cool air mixture in said upper and lower chamber.

4. The automotive air conditioning system as set forth in claim 3, wherein said shutter door is operative to open said third passage toward said upper air mix chamber when an open angle of an air mix door comprising said first control means is larger than a given angle to introduce air into said means for heating air in a proportion greater than a predetermined value.

5. The automotive air conditioning system as set forth in claim 3, wherein said system further includes a second air mix door comprising said second control means adapted to adjust an amount of said hot air delivered from said heating means.

6. The automotive air conditioning system as set forth in claim 1, wherein said one-way air flow means blocks air flow from said upper air mix chamber to said third passage responsive to an air pressure in said upper air mix chamber being higher than that in said third passage and establishes air flow from said third passage to said upper air mix chamber responsive to said air pressure in said third passage being higher than that in said upper air mix chamber.

7. The automotive air conditioning system as set forth in claim 1, wherein said shutter door is responsive to the air pressure in said upper air mix chamber being higher than that in said third air passage to seal said third air passage and is responsive to air pressure in said third air passage being higher than that in said upper air mix chamber to open said third air passage.

8. The automotive air conditioning system as set forth in claim 7, wherein said shutter door is pivotably supported by one edge of said heater core for free movement in response to the pressure difference between said upper air mix chamber and said third air passage.

9. An automotive air conditioning system, comprising:
    means for cooling inlet air;
    means for heating inlet air;
    an upper air mix chamber;
    a lower air mix chamber;
    a first air outlet communicating said upper air mix chamber to a vehicle compartment;
    a second air outlet communicating said lower air mix chamber to said vehicle compartment;
    a first air passage connecting said cooling means to said upper air mix chamber for delivering cool air from said cooling means to said upper air mix chamber, said first air passage facing an inlet of said means for heating air;
    a second air passage connecting said cooling means to said lower air mix chamber for delivering cool air from said cooling means to said lower air mix chamber;

a third passage connecting an outlet of said means for heating air to said lower air mix chamber for delivering hot air from said means for heating air to said lower chamber;

a first proportional control means associated with said inlet of said means for heating air for controlling the proportion of said cool air to be delivered through said first passage and to be delivered into said means for heating air;

a second proportional control means associated with said second air passage for controlling the proportion of cool air to be delivered to said lower air mix chamber through said second air passage;

one-way air flow means communicating with said third air passage and including a shutter door for establishing one-way air flow from said lower air mix chamber to said upper air mix chamber and for blocking air flow from said upper air mix chamber to said lower air mix chamber, said shutter door being responsive to the air pressure in said upper air mix chamber being higher than than in said lower air mix chamber to prevent air flow through said third air passage and being responsive to the air pressure in said lower air mix chamber being higher than that in said upper air mix chamber to allow air flow through said third air passage;

a third proportional control means associated with said outlet of said means for heating air for controlling the proportion of said hot air to be delivered to said upper air mix chamber through said one-way air flow means and to be delivered to said lower air mix chamber through said third air passage.

10. The automotive air conditioning system as set forth in claim 9, wherein said system includes means for feeding a first predetermined portion of heated air through said one-way air flow means into said upper chamber, and means for feeding a second predetermined portion of heated air through said third passage and into said lower chamber.

11. The automotive air conditioning system as set forth in claim 9, wherein said shutter door is freely pivotable about a horizontal axis and seals said third passage when no forces due to air pressure are exerted thereon.

12. An automotive air conditioning system, comprising:

means for cooling inlet air;

means for heating inlet air;

an upper air mix chamber located adjacent an upper air outlet for discharging the air therein through said upper air outlet to a vehicle compartment;

a lower air mix chamber located adjacent a lower air outlet for discharging the air therein through said lower air outlet to a vehicle compartment;

a cooling air passage connecting said cooling means to each of said upper and lower air mix chambers;

a heating air passage connecting said heating means to both of said upper and lower air mix chambers and including means for introducing a controlled amount of heating air respectively to said upper and lower air mix chambers therethrough; and one-way air flow means including a shutter door communicating with said heating air passage and operative between a first shutting position and a second opening position, said air flow means being responsive to an air pressure in said upper air mix chamber being greater than an air pressure in said lower air mix chamber for positioning said shutter door at said first shutting position, and being responsive to said air pressure in said lower air mix chamber being greater than said air pressure in said upper air mix chamber for positioning said shutter door at said second opening position for allowing said heating air from said heating means to pass from said heating air passage and to enter said upper air mix chamber.

13. The automotive air conditioning system as set forth in claim 12, wherein said shutter door is pivotably positioned between said outlet of heating means and said upper air mix chamber for free movement about a pivot axis in response to a pressure differential between said upper air mix chamber and said heating air passage.

14. The automotive air conditioning system as set forth in claim 12, wherein said heating air passage establishes permanent air communication between said outlet of said heating means and said lower air mix chamber.

* * * * *